United States Patent
Bidare

(10) Patent No.: US 8,885,481 B2
(45) Date of Patent: Nov. 11, 2014

(54) SYSTEM AND METHOD FOR HYBRID TELECOMMUNICATION

(75) Inventor: Prasanna Bidare, Bangalore (IN)

(73) Assignee: Tata Consultancy Services Ltd. (IN)

( * ) Notice: Subject to any disclaimer, the term of this patent is extended or adjusted under 35 U.S.C. 154(b) by 364 days.

(21) Appl. No.: 13/433,512

(22) Filed: Mar. 29, 2012

(65) Prior Publication Data
US 2013/0258857 A1 Oct. 3, 2013

(51) Int. Cl.
*H04L 12/26* (2006.01)
*H04L 12/803* (2013.01)
*H04W 28/08* (2009.01)

(52) U.S. Cl.
CPC ............. *H04W 28/08* (2013.01); *H04L 47/125* (2013.01); *Y02B 60/50* (2013.01)
USPC ........................................................ 370/237

(58) Field of Classification Search
None
See application file for complete search history.

(56) References Cited

U.S. PATENT DOCUMENTS

| | | | |
|---|---|---|---|
| 6,600,741 B1 | 7/2003 | Chrin | |
| 6,879,585 B2 * | 4/2005 | Sandhu | .................... 370/355 |
| 2002/0007404 A1 * | 1/2002 | Vange et al. | ................ 709/217 |
| 2003/0179720 A1 | 9/2003 | Cuny | |
| 2004/0215687 A1 | 10/2004 | Klemba | |
| 2007/0230427 A1 | 10/2007 | Arseneault | |
| 2007/0249379 A1 * | 10/2007 | Bantukul | .................... 455/466 |
| 2008/0261602 A1 | 10/2008 | Livneh | |

* cited by examiner

*Primary Examiner* — Ian N Moore
*Assistant Examiner* — Brian T Le
(74) *Attorney, Agent, or Firm* — Robert Plotkin, P.C.

(57) ABSTRACT

A hybrid telecommunication system for providing data to a requesting mobile device has been disclosed. The system includes a base station server adapted to receive the data request signals. The base station server is adapted to sense the density of current data signals on the conventional wireless network and subsequently redirect at least some of the received data request signals from the conventional wireless network to the hybrid data server connected to a wireline network in the event that the density of data signals present on the conventional wireless network exceeds a pre-determined threshold value. Once the data request signals are redirected to the hybrid data server, the rest of the communication to and from the requesting mobile device takes place through a private, wireless communication bandwidth.

12 Claims, 10 Drawing Sheets

SYSTEM AND METHOD FOR HYBRID TELECOMMUNICATION

FIELD OF THE DISCLOSURE

This disclosure relates to the field of telecommunication. Particularly, the disclosure relates to data communication on wireless carriers.

Definitions of Terms Used in the Specification

Requesting Mobile Devices—The term 'requesting mobile devices' in this disclosure relates to any device, gadget, equipment or instrument which can communicate with other similar devices using any wireless communication medium including GSM, CDMA, OFDM, WiMax, 2G/3G and the like. For instance these devices can be smart mobile phones, iPODs, PDAs, iPhones, pagers and the like.

Conventional Wireless Network—The term 'conventional wireless network' in this disclosure relates to any wireless communication medium including GPRS (General Packet Radio Service), 2G telecom network, 3G telecom network, WiMax, EDGE network and their upgrades, through which users' mobile devices typically communicate.

Data Request Signal—The term 'data request signal' in this disclosure refers to the signal containing temporary information pertaining to the operations to be performed on the internet. For instance the request signal may contain cookies, session variables, and temporary information.

Data Packet—A data packet contains the data requested through the data request signal. This data can be live text in internet relay chatting, or images, or videos, other interactive information and the like.

These definitions are in addition to those expressed in the art.

BACKGROUND

Today, internet is being used as one of the major communication channels to connect data links of different types. However, as the mobile spectrum offers choice of data communications links, the two major issues that need to be addressed are:

1. congestion in conventional wireless network due to excessive data packets on the mobile spectrum,
2. point to point connectivity within the ubiquitous internet world for secured packet transactions Congestion: due to excessive data traffic is one of the major issues faced by most of the wireless telecommunications service providers. Congestion is mostly caused because of data calls made using conventional wireless network services provided by the service providers. With an increase in the number of mobile phone (hand sets and ISU do offer such facility to improve internet access on mobile phones) users availing these services, the issue of congestion is expected to get larger and larger.

It has been observed that during peak hours i.e office hours and evening hours, both voice calls and SMS calls are made in large numbers. Since a large amount of data is also transferred through these cellular or mobile networks during the peak hours, the cellular/mobile network often faces disturbance, cross talk, co-channel and inter channel interference, and in several cases network breakdown. Problems of network congestion are amplified in areas which are frequently visited by a large number of people. Such areas include business organizations, educational institutions, corporate offices and the like.

To overcome the problems of congestion in the mobile/cellular network, several approaches such as the frequency reuse have been tried before. This approach allows the communication channel to be reused frequently in order to prevent/reduce congestion to some extent. However, this approach has several de-merits such as frequencies or channels can be reused outside the range of cells or certain predetermined distance from current cell site and in case of presence of multiple congestion locations during peak hours it becomes difficult, complex and costly to deploy the frequency reuse method propagated by this approach.

Also, various algorithms have been proposed before for controlling congestion of cellular wireless networks by prioritizing, de prioritizing the users request and queuing the requests. But, these algorithms are only defined for specific situations and the random nature of congestion of mobile wireless network is not taken into consideration by these algorithms.

Some systems have also been implemented before such as the one envisaged by United states patent application 20030179720 which includes a packet switched network for sending and receiving data traffic between a mobile terminal and a data packet sender. The system comprises a plurality of uplink buffers and downlink buffers wherein each uplink and downlink buffer pair is associated with a specific communication channel for use by the mobile terminal, the system being characterized in that the system includes means for controlling excessive congestion of packets accumulating in the buffers in a network element between the sender and the receiver terminals during a data transfer.

This approach has many disadvantages such as providing multiple buffers for multiple channels adds to cost and complexity of the system; in case of heavy load condition users would feel disturbances, distortions because of congestion. Another major issue is the availability of wireless transmitter power to address the reach of ISU mobile clients and power enhancements at the tower as the transmitting wavelength becomes sharper and sharper. This effect gets compounded as the clients make more and more data calls from their mobile handsets.

One more disadvantage of the above mentioned approach is that it requires a substantial change in the present conventional wireless network infrastructure and hence, is time consuming and a costly affair.

Point to point connectivity offering is another process that the financial world (Banking and Financial Institutions) can benefit from. In the financial world, several million clients request access to a few servers which are associated banking and financial agencies. Such a scenario warrants the requesting parties to be pre-registered with the servers that they request access to. Moreover, transactions between pre-agreed partners also warrant hacker-resistant, private point to point bandwidth during the transaction.

In case of banking and financial institutions, certain transactions such as electronic funds transfer, online banking and the like are also considered sensitive in nature because they involve exchange of sensitive client related information including but not restricted to client's bank account number, password and personal identification number. Since the aforementioned transactions are sensitive in nature and involve exchange of critical financial information, they are often targeted by hackers.

Some of the popular techniques used by the hackers include:

Man-in-the-Middle attack: It is a form of active eavesdropping. Here the attacker makes the victims (two parties involved in the communication) believe that they are talking directly to each other over a private connection, by making independent connection and relaying messages between them, whereas the entire conversation is being eavesdropped upon by the attacker.

Man-in-the-Browser attack: Man in the browser attack involves creating a Trojan that infects a Web browser. In a completely covert way, invisible to both the user and host application, this malware modifies the pages, modifies transaction content or inserts additional transactions. This attack can succeed irrespective of whether security mechanisms such as SSL/PKI and/or two- or three-factor authentication solutions are in place.

In a conventional communication environment, users use their mobile devices to access the web servers associated with providers of sensitive services, such as BFIs. The bandwidth required by the users to access web servers is typically provided by a conventional wireless network or ISP. Due to the kind of packet routing and connectivity associated with the conventional wireless networks, on which neither BFI agencies nor their clients can control several hacking actions arising, hackers can plant themselves in the middle on account of multiple open connection links.

Further, the bandwidth is simultaneously utilized by multiple service providers to provide wireless connectivity to their respective clients. Since the conventional wireless network is used by multitude of users/clients at any given point of time, there is a possibility that the conventional wireless network might compromise the security of the data traffic. Despite several security measures in place by way of implementing several layers of cryptographic process, the public communication links between the servers associated with banking and financial institutions and their clients are vulnerable for data theft and cash loss.

Therefore, there was felt a need:

for a system that helps in preventing congestion due to routing of data calls through wireless telecommunication network;

for a robust system to prevent congestion which is compatible with present wireless infrastructure;

for a system which is easy to deploy and is cost effective with high scalability;

for a parallel platform for handling data call traffic;

for a system that helps reduce power consumption at transmitting and receiving tower to improve on the GREEN environment;

a telecommunication system which could provide a point to point connectivity in the virtual internet environment for all kinds of data logins corresponding to the banking and financial institutions; and offer a private communication bandwidth for secured, hack resistant communication.

OBJECTS

Some of the objects of the present disclosure, which at least one embodiment herein satisfy, are as follows:

An object of the present disclosure is to provide a system which can prevent congestion due to data calls in wireless telecommunication network.

Another object of the present disclosure is to provide a robust system to prevent congestion which is compatible with present wireless infrastructure.

Yet another object of the present disclosure is to provide a system which is easy to deploy and is cost effective yet highly scalable;

Still another object of the present disclosure is to provide a space effective and time effective system;

Still further object of the present disclosure is to provide a parallel platform for handling data call traffic; and One more object of the present disclosure is to provide high speed internet connectivity to users during travel.

Still further object of the present disclosure is to provide private bandwidth to mobile devices for point-to-point communication within the internet.

An additional object of the present disclosure is to reduce power consumption at telecommunication towers.

Other objects and advantages of the present disclosure will be more apparent from the following description when read in conjunction with the accompanying figures, which are not intended to limit the scope of the present disclosure.

SUMMARY

The present disclosure envisages a hybrid telecommunication system for providing data to requesting mobile devices. The system, in accordance with the present disclosure includes:

a requesting mobile device adapted to transmit data request signals, the requesting mobile device further adapted to receive data packets containing data requested through the data request signals;

a support node adapted to store at least one of the ID, location information, data packet routing information and user profile information corresponding to the, requesting mobile devices;

a base station server adapted to receive the data request signals, the base station server comprising:

load sensing means adapted to sense the density of current data signals on the conventional wireless network; and switching means co-operating with the load sensing means and adapted to redirect at least some of the received data request signals from the conventional wireless network to the hybrid data server connected to a optical carrier in the event that the density of data signals present on the conventional wireless network exceeds a pre-determined threshold value;

a hybrid data server adapted to:

receive redirected data request signals;

receive at least one of the ID, location information, data packet routing information and user profile information corresponding to the requesting mobile device, from the support node;

retrieve from at least one web server, the data requested through the data request signals; and transmit the retrieved data along with the ID, location information, data packet routing information, user profile information corresponding to the requesting mobile device, to the hybrid tower management server;

a hybrid framer server adapted to:

convert the data received from the hybrid data server to data packets according to packet data protocol format; and transmit converted data packets along with at least one of the ID, location information, data packet routing information corresponding to the requesting mobile device (10) to the hybrid tower management server through the optical carrier; and a hybrid tower management server adapted to:
- convert the data received from the hybrid data server to data packets according to packet data protocol format;
- identify the requesting mobile device based on at least one of the ID, location information, data packet routing information, user profile information received from the hybrid framer server;
- allocate private, wireless communication bandwidth for transmitting converted data packets to the requesting mobile device;
- transmit the converted data packets to the requesting mobile device using the private, wireless communication bandwidth.

Typically, in accordance with the present disclosure, the base station server further includes notification means adapted to notify the user of requesting mobile device (10) about the diversion of data request signals to the hybrid data server.

Typically, in accordance with the present disclosure, the hybrid data server is adapted to store at least one of the ID, location information, data packet routing information and user profile information corresponding to the requesting mobile device.

Typically, in accordance with the present disclosure, the data request signals include data call requests for downloading content from the interne using the conventional wireless network.

Typically, in accordance with the present disclosure, the hybrid data server is adapted to extract information from received data request signals and convert them into signals compatible with the web server.

Typically, in accordance with the present disclosure, the optical carrier is a communication network, at least partially formed by optical fibers.

The present disclosure envisages a method of providing data to requesting mobile devices using a hybrid telecommunication system.

The present disclosure envisages a method for providing data to a requesting mobile device using a hybrid telecommunication system. The method, in accordance with the present disclosure includes the following steps:
- sending data request signals in the form of packets from the requesting mobile device;
- receiving the data request signals at a base station server;
- sensing, at the base station server, the density of current data signals present on the conventional wireless network; and
- redirecting at least a portion of the data request signals on to a hybrid server, in the event that the density of the current data signals present on the conventional wireless network exceeds a pre-determined threshold value.

The present disclosure envisages a method for providing data to a requesting mobile device using a hybrid telecommunication system. The method, in accordance with the present disclosure includes the following steps:
- receiving redirected data request signals at a hybrid data server;
- instructing the hybrid data server to access and retrieve from at least one web server, the data requested through the data request signals;
- converting the retrieved data into data packets according to packet data protocol format;
- transmitting the data packets along with at least one of the ID, location information, data packet routing information corresponding to the requesting mobile device, to a hybrid tower management server through the optical carrier;
- instructing the hybrid tower management server to allocate private, wireless communication bandwidth necessary for transmitting converted data packets to the requesting mobile device; and
- transmitting the converted data packets from said hybrid tower management server to the requesting mobile device using said private, wireless communication bandwidth.

Typically, in accordance with the present disclosure, the step of redirecting at least a few data request signals, further includes the step of redirecting at least a few data signals onto the hybrid data server through the optical carrier.

Typically, in accordance with the present disclosure, the step of receiving at a hybrid data server, the redirected data request signals further includes the step of receiving at least one of the ID, location information, data packet routing information and user profile information corresponding to the requesting mobile device.

Typically, in accordance with the present disclosure, the step of instructing the hybrid data server to access and retrieve from at least one web server, the data requested through said data request signals, further includes the step of transmitting the retrieved data along with the ID, location information, data packet routing information, user profile information corresponding to the requesting mobile device, to the hybrid framer server.

Typically, in accordance with the present disclosure, the step of converting the retrieved data into data packets according to packet data protocol format further includes the step of transmitting converted data packets along with at least one of the ID, location information, data packet routing information corresponding to the requesting mobile device to the hybrid tower management server through a optical carrier.

Typically, in accordance with the present disclosure, the step of transmitting to the requesting mobile device, through the optical carrier, the data packets received at the hybrid tower management server further includes the step of identifying the requesting mobile device based on at least one of the ID, location information, data packet routing information, user profile information corresponding to the requesting mobile device.

BRIEF DESCRIPTION OF ACCOMPANYING DRAWINGS

The present invention will now be described with reference to the non-limiting, accompanying drawings, in which.

DETAILED DESCRIPTION OF THE ACCOMPANYING DRAWINGS

The hybrid telecommunication system will now be described with reference to the accompanying drawings which do not limit the scope and ambit of the disclosure. The description provided is purely by way of example and illustration.

The various features and advantageous details are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
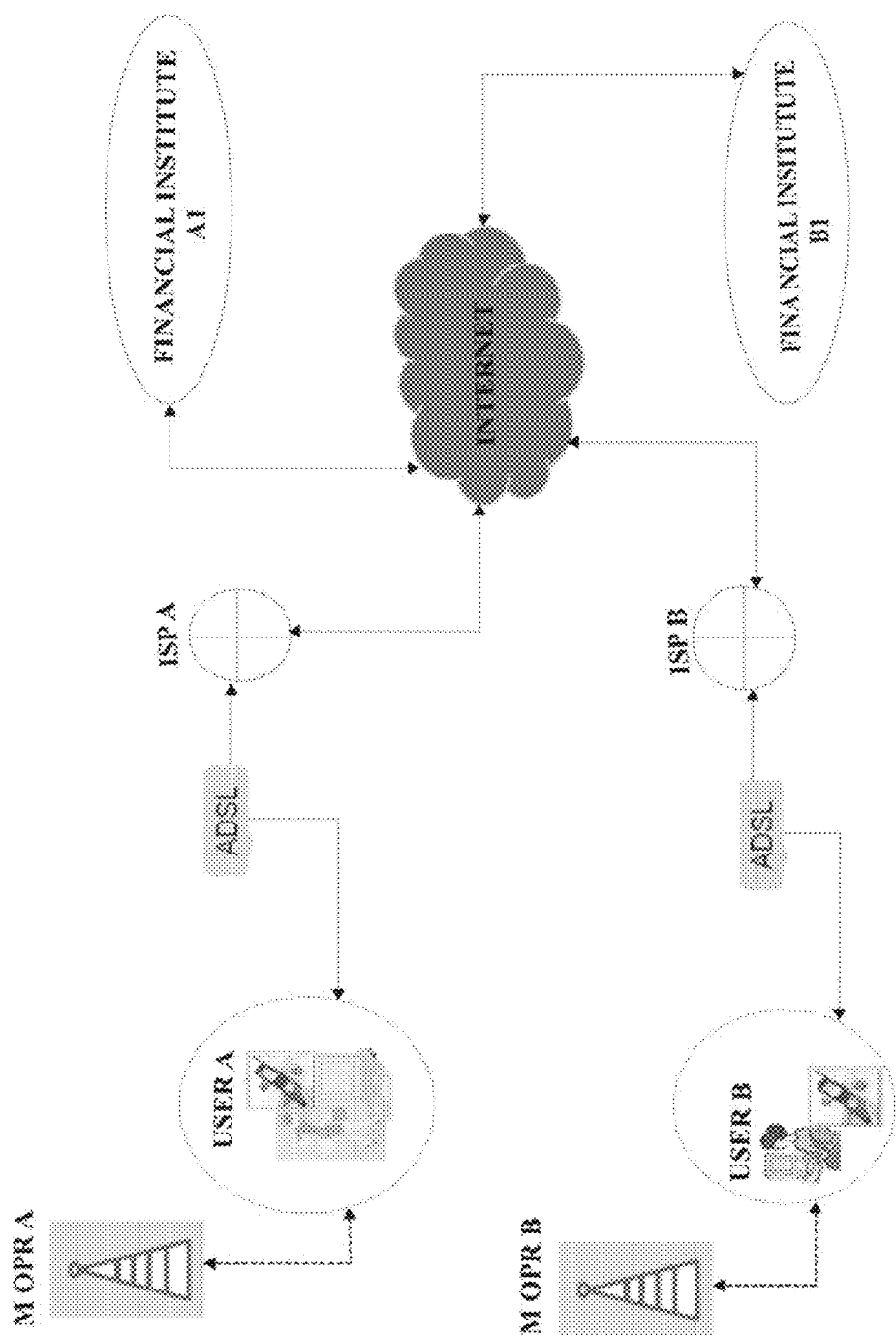
FIG. 1 is a flow chart illustrating the conventional mode of communication.

FIG. 1 illustrates a flow chart corresponding to the conventional mode of communication wherein users communicate with the respective web servers using the conventional wireless network. In the conventional mode, clients use their communication gadgets to access the web servers. As shown in FIG. 1, 'User A' and a 'User B' use their wire-line or wireless communication gadgets including but not restricted to mobile phone, laptop computer, desktop computer and iPad to log on to the Internet to connect to the desired financial institution 'A1' or 'B1'. As seen in FIG. 1, 'User A' connects to the 'ISP A' and 'User B' to 'ISP B' (Internet Service Provider) using a range of technologies including conventional wireless networks or physical ADSL (Asymmetric Digital Subscriber Line) line. Subsequently, User 'A' and User 'B' log on to the predetermined public net-banking website using their pre-registered login credentials. The safety of the credentials and the financial transaction data is ensured by utilization of cryptography applications interfaces in the conventional systems. This conventional mode of carrying out the communication is not secure as it is not possible to trace the connection details between the bank and users/ clients, thus an illegitimate connection cannot be refused by the net-banking application.

Moreover, traditional ADSL communication line or conventional wireless network, such as the GPRS/3G/2G/WiMax/EDGE network is simultaneously utilized by multiple interne service providers to provide internet connectivity to their respective clients. The security available to such shared ADSL lines/ GPRS/3G/2G/WiMax/EDGE network is restricted to standard cryptographic applications. Given the widespread use of shared ADSL lines and conventional wireless networks, it is possible that even unethical users and hackers are conversant with the encryption standards used across the standard shared communication lines. Therefore, there is a possibility that the communication taking place between the user and the corresponding web server over the shared ADSL lines/ GPRS/3G/2G/WiMax/EDGE network may be hacked onto. Moreover, since even web servers, in this case the web servers associated with 'Bank A' and 'Bank B' are made accessible through shard ADSL line/ conventional wireless network, there is a possibility that any communication initiated by the user, and approved, managed by the corresponding web server might be hacked onto.

Therefore, to overcome the drawbacks associated with the conventional mode of communicating web servers and to overcome the drawbacks such as congestion due to excessive data traffic in the conventional wireless network, lack of security in the wireless network, the present disclosure envisages a system that acts as a secured gateway between the users and the corresponding web servers. In case of conventional wireless network, users directly log on to the required web servers. Considering sensitive electronic financial transactions as an example, most of the users make use of conventional wireless network to conduct banking transactions which involve exchange of confidential data. Such network, being accessible to a multitude of users, is vulnerable to hacker attacks, phishing attacks, spoofing attacks and the like.

Therefore, in order to overcome the aforementioned drawbacks, the present disclosure envisages a system which diverts the data request signals and the corresponding data packets which would have been transmitted over the wireless network, to a parallel convergence path which includes an optical carrier for transmitting the data packets corresponding to the data request signals. The optical carrier, in accordance with the present disclosure is basically an optical network consisting of high speed and high data rate optical fibers, typically having a data rate of 2GBPS and hence use of this alternative wired network provides high speed interne connectivity even during travel.

Figure 2:
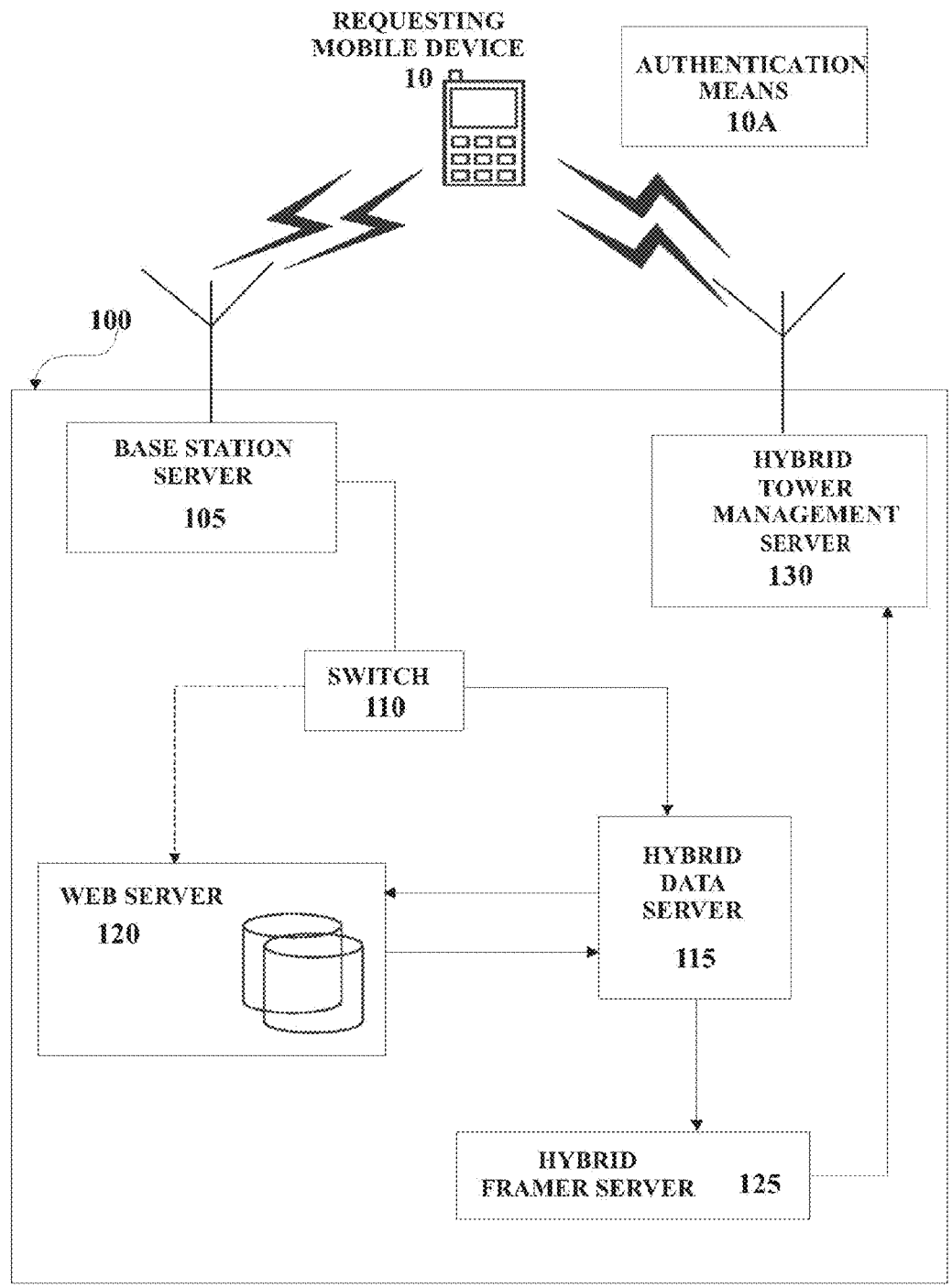
FIG. 2 illustrates a hybrid telecommunication system for providing data onto a requesting mobile device.

Referring to FIG. 2 there is shown a hybrid telecommunication system 100 for providing data to a requesting mobile device. The hybrid telecommunication system 100 reduces the load on the wireless carrier network (GPRS/3G/2G/WiMax/EDGE network).

In accordance with the disclosure, when a user initiates a data call using his/her GPRS/3G/2G/WiMax/EDGE enabled mobile device (referred to as requesting mobile device hereafter). The requesting mobile device 10 creates data request signals corresponding to the data call made by the user. The data request signals typically contain cookies or temporary files or session variables which in turn contain information about the operation initiated by the user through the requesting mobile device. For instance, cookies may contain the information for downloading an image from a website. Another instance can be considered of a user who uses the micro-browser embedded within the mobile device or some WAP application for live chatting or listening to music.

In accordance with this disclosure the data request signals are transmitted typically in the form of data packets. It should be well understood to the people skilled in the art that these data request signals or data packets may be modulated and/or multiplexed and/or encoded using known techniques or can contain such modulated and/or multiplexed and/or encoded information.

In accordance with the present disclosure, there is provided a support node (not shown in figures) adapted to store at least one of the ID, location information, data packet routing information and user profile information corresponding to the requesting mobile device. The location information corresponding to the requesting mobile device 10 includes at least the visitor location information and the home location information. The user profile information corresponding to the requesting mobile device 10 includes at least the IP address being used by the requesting mobile device 10 and the IMSI (International Mobile Subscriber Identity). The data packet routing information typically includes the path information corresponding to the network path used by the outgoing/incoming data packets.

The data request signals are transmitted from the requesting mobile device 10 to a base station server 105 using a conventional wireless network.

In accordance with this disclosure, a response to the received data request signals is provided on the requesting mobile device 10 subsequent to the processing of the data request signals. If the data request signals correspond to a request to download images/certain text through the interne, then such data request signals will be routed to the appropriate web server (denoted by reference numeral 120 in this case) which processes the data request signals and retrieves the data requested by the data request signals. Subsequently the retrieved data would be transmitted to the requesting mobile device, typically in the form of data packets.

In accordance with this disclosure, the requesting mobile device 10 is typically connected to a conventional wireless network through which it sends the data request signals to the base station server 105. Typically, all the telecommunication service requests including broadband access requests are routed to the base station server 105. The base station server 105 includes a packet control unit (not shown in figures) which is adapted to differentiate between the data requests designated for the GSM (Global System for Mobile Communications) network, which typically include circuit switched data and the data requests designated for the conventional wireless network, which accepts packet switched data.

The base station server 105 communicates with the requesting mobile device 10 through a base station transceiver (not shown in figures). The base station server 105 manages one or more base transceiver station(s) through which the aforementioned requests would be routed. The base station transceiver includes radio transmission and reception equipment such as antennas, and the signal processing equipment required for radio signal processing. The data request signal initiated from the requesting mobile device 10 is received firstly at the base station transceiver and is subsequently transmitted to the base station server 105. If the packet control unit of the base station server 105 determines that the data request signals correspond to the conventional wireless network, then the load-sensing means 165 senses the density of the current data signals present on the wireless network. While sensing the load on the wireless network, certain factors including but not restricted to density of current data signals, time of the day, expected data transfer rate for the next few hours are taken into consideration by the load-sensing means 165. If the load sensing means 165 determines that the density of the current data signals on the wireless network exceeds a pre-determined threshold value, then the load sensing means 165 instructs switching means 110 to switch at least some of the received data request signals onto an optical carrier which is in turn connected to a hybrid data server 115.

Subsequent to the load sensing means 165 deciding to switch at least some of the received data request signals on to the hybrid data server 115, the switching means 110 terminates the standard wireless connection which would have otherwise been used for communication with the requesting mobile device. This approach helps in preventing excessive utilization of the wireless network for delivery of data packets, and makes the wireless network bandwidth available for transmission of voice data packets. In accordance with the present disclosure, the base station server 105 further includes notification means (not shown in figures) adapted to notify the user of the requesting mobile device 10 about the diversion of data request signals to the hybrid data server 115.

The Hybrid data server 115 apart from receiving the redirected data request signals also receives at least one of the ID, location information, data packet routing information and user profile information corresponding to the requesting mobile device. The hybrid data server 115 makes use of the aforementioned information to identify the requesting mobile device. Moreover the hybrid data server 115 includes processing means 160 which is adapted to process the received data request signals and convert the information embodied in the received data request signals to a format compatible to be utilized with the web server 120. For instance, the cookies contained in the received data request signals could be converted into web cookies. The hybrid data server 115 cooperates with the web server 120 which processes the converted information in order to fulfill the request received from the requesting mobile device. The hybrid data server 115 access the web server 120 in order to retrieve from the web server 120 the data requested through the received data request signals. The web server 120 takes care of the processing of the received data request signals, i.e. the web server 120 processes the information included in the received data request signals and accordingly makes use of the information to search for and retrieve the data/content requested through the received data request signals. Subsequently the hybrid data server 115 converts the data retrieved by the web server 120 into data packets. The data packets generated by the hybrid data server 115 are typically in a format compatible with the wireless network.

In accordance with the present disclosure, the communication between switching means 110 and hybrid data server 115 and the communication between hybrid data server 115 and web server 120 is performed using an optical carrier, for example, Passive Optical Network (PON) connections. The passive optical network, in accordance with the present disclosure is a point-to-point, fiber to premises network architecture which makes use of unpowered optical splitters. PONs are utilized to facilitate the communication between switching means 110 and hybrid data server 115, and the communication between hybrid data server 115 and web server 120 because they reduce the amount of fiber and the amount of central office equipment required. Well known encryption techniques are also employed in order to prevent eavesdropping of the communication between the switching means 110, hybrid data server 115 and the web server 120. In accordance with the present disclosure, standardized multiplexing protocols such as Synchronous Optical Networking (SONET) and/or Synchronous Digital Hierarchy (SDH) are used to transmit the data streams over the passive optical network.

Subsequent to the conversion, the hybrid data server 115 is further adapted to transmit the data retrieved from the web server 120 along with the ID, location information, data packet routing information, user profile information corresponding to the requesting mobile device, received from the support node, to the hybrid framer server denoted by the reference numeral 125. The hybrid data server 115 is connected to the hybrid framer server 125 through the wire line network which includes the passive optical network. The hybrid framer server 125 is adapted to convert the data received from the hybrid data server 115 to data packets according to PDP (Packet Data Protocol) format. The hybrid framer server 125 also receives at least one of the ID, location information, data packet routing information corresponding to the requesting mobile device, from the hybrid data server 115.

The data packets transmitted from the hybrid data server 115 to the hybrid framer server 125 are in the form of packets compatible with the conventional wireless network. The hybrid framer server 125 is further adapted to convert the received data packets into appropriate PDP (Packet Data Protocol) format. The hybrid framer server 125 also stores the network address of the hybrid data server 115 from which it received the data packets in a format compatible with the conventional wireless network. Subsequent to conversion of the received data packets into PDP format, the hybrid framer server 125 transmits the converted data packets to a hybrid tower management server denoted by the reference numeral 130. Along with the converted data packets, the hybrid framer server 125 also transmits to hybrid tower management server 130, the ID, location information, data packet routing information, user profile information corresponding to the requesting mobile device.

The hybrid tower management server 130 is adapted to identify the requesting mobile device 10 based on at least one of the ID, location information, data packet routing information, user profile information received from the hybrid framer server 125. Subsequently, the hybrid framer server 125 transmits the received data packets to the identified requesting mobile device 10 through the optical carrier instead of using the conventional wireless network. In accordance with the present disclosure, subsequent to the termination of transmission between the hybrid tower management server 130 and the requesting mobile device, the hybrid tower management server 130 sends an acknowledgment to the switching means 110 which resumes the terminated wireless network connection to the requesting mobile device 10.

Figure 3:
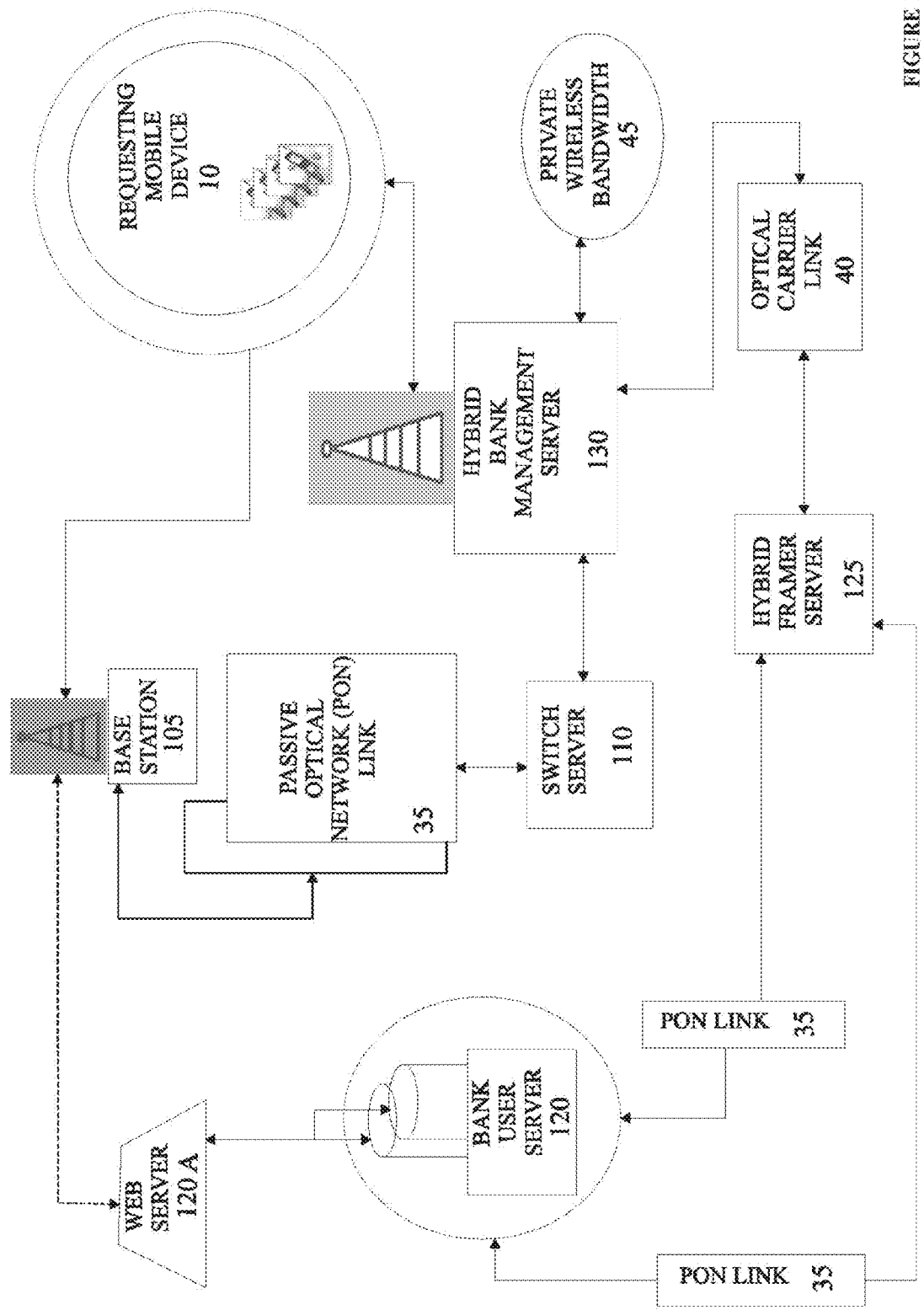
FIG. 3 illustrates an exemplary embodiment of the present disclosure which offers point to point connectivity in the internes world.

FIG. 3 illustrates an exemplary embodiment of the present disclosure which offers point to point connectivity in the interne world. According to this embodiment, the hybrid telecommunication system is utilized for facilitating banking transactions. In FIG. 3, the data path denoted by dotted lines describes the conventional mode of carrying out banking transactions wherein users directly contact the bank server through a mobile device. As shown in FIG. 3, users make use of mobile devices denoted by reference numeral 10 (referred to as 'requesting mobile devices') to access the bank web server 120. As shown in FIG. 2, users through their mobile devices request to log on to the bank web server 120. In case of a typical banking transaction, the data request signals sent by a user also include the authentication credentials corresponding to the user. Such authentication credentials, in the form of data request signals are transmitted over the conventional wireless network to the web server 120.

The bank web server 120 verifies the authentication credentials provided by the user through the data request signal and subsequently, depending upon the genuineness of the provided authentication credentials, selectively authorizes the user to access the bank web server 120. The subsequent communication between the requesting mobile device 10 associated with the user, and the bank web server 120 takes place as explained below.

The data request signals corresponding to the subsequent communication from the requesting mobile device 10 are received at the base station server 105. The base station server 105 is communicably coupled to a switch server 110 through a Passive Optical Network (PON) link denoted by reference numeral 35. The passive optical link 35 is a physical link created using optical fiber cables. The switch server 110 is adapted to sense the current load/current density of data packets on the wireless network maintained by cellular operator. Depending upon the current load/current density of the data packets on the wireless network, the switch server 110 redirects at least a few of the incoming data request signals onto the hybrid tower management server 130. The hybrid tower management server 130 communicates with hybrid framer server 125 through an optical carrier link denoted by reference numeral 40. The hybrid tower management server 130 transmits the received data request signals to the hybrid framer server 125. It is well known that the data request signals generated from a mobile device are in a packet data format. Therefore the hybrid framer server 125 converts the incoming data request signals which are in the form complaint with the packet data protocol to a format compatible with the bank web server 120. The telecommunication system 100, in accordance with the present disclosure makes use of a dedicated optical carrier instead of the conventional wireless network to carry the data request signal emanating from the requesting mobile device 10, thereby providing a virtual, point to point connectivity between the requesting mobile device 10 and the bank web server 120.

The return communication form the bank web server 120 to the requesting mobile device 10 is transmitted from the bank web server 120 through the PON link, firstly to the hybrid framer server 125 which coverts it into the appropriate packet format and forwards it via the optical carrier (PON Link) to the hybrid tower management server 130. The hybrid tower management server 130, subsequent to receiving the acknowledgement form the bank web server 120 about the genuineness of the user associated with the requesting mobile device, allocates private, wireless bandwidth denoted by reference numeral 45 for any further communication between the requesting mobile device 10 and the hybrid tower management server 130.

In accordance with the present disclosure, all the further data request signals apart from the initial request signals that contain the authentication credentials, emanating from the user's requesting mobile device 10 will be routed through the private, wireless communication bandwidth to the hybrid tower management server 130. Subsequently, the hybrid tower management server 130 routes the request signals through the optical carrier to the hybrid packet framer 125, from where the request signals are transmitted to the bank web server 120. The hybrid telecommunication system of the present disclosure provides virtual, point to point connectivity between the requesting mobile device 10 and the respective bank web server 120 by offering the requesting mobile device 10 with private wireless bandwidth to initiate and complete the new communication. The initial data request signals are received by the hybrid tower management server 130 which subsequently makes use of the optical carrier (PON Link) to carry forward and process the request initiated through the requesting mobile device 10.

Figure 4:
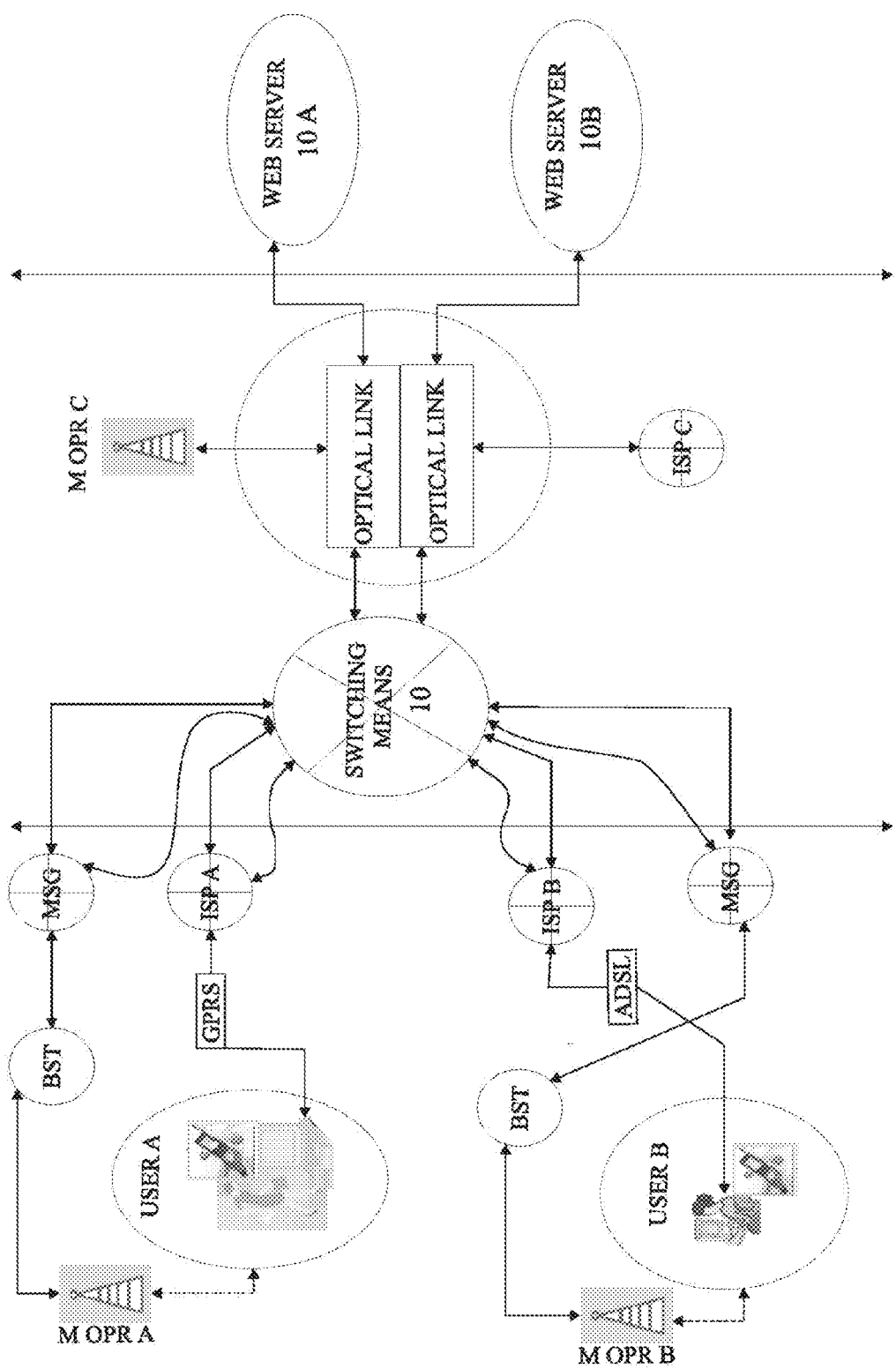
FIG. 4 illustrates a flow chart corresponding to the manner in which the system of the present disclosure provides users with secured access to web servers.

Referring to FIG. 4, there is shown a flow chart corresponding to the manner in which the system 100 of the present disclosure provides users with secured access to web servers. According to FIG. 4, a first user makes use of the mobile phone to access a web server. The wireless communication line is typically in the form of GPRS network. Unlike the setup seen in FIG. 1, in case of FIG. 4 the user connects to a switching means 10 instead of establishing a direct connection with the corresponding web server. The switching means 10 is connected to a mobile service switching center from where the access request generated by the user is transmitted to the switching means 10. After receiving the request from the user, the switching means 10 transfers the request from the conventional wireless network to a private hybrid communication network. Subsequently, a point-to-point, virtual communication link which makes use of private bandwidth, is established via the switching means 10, between the requesting mobile devices associated with the user and the web server the user wished to access. As shown in FIG. 4, the hybrid telecommunication network includes dedicated fiber optical links to every web server (in this case, web server 'A' and web server 'B') from the switching means 10. Subsequent to the transfer of the user request from the conventional wireless network to the dedicated fiber optic network, rest of the communication between the user and the corresponding web server takes place through the newly established fiber optic link rather than the conventional wireless network.

Figure 5:
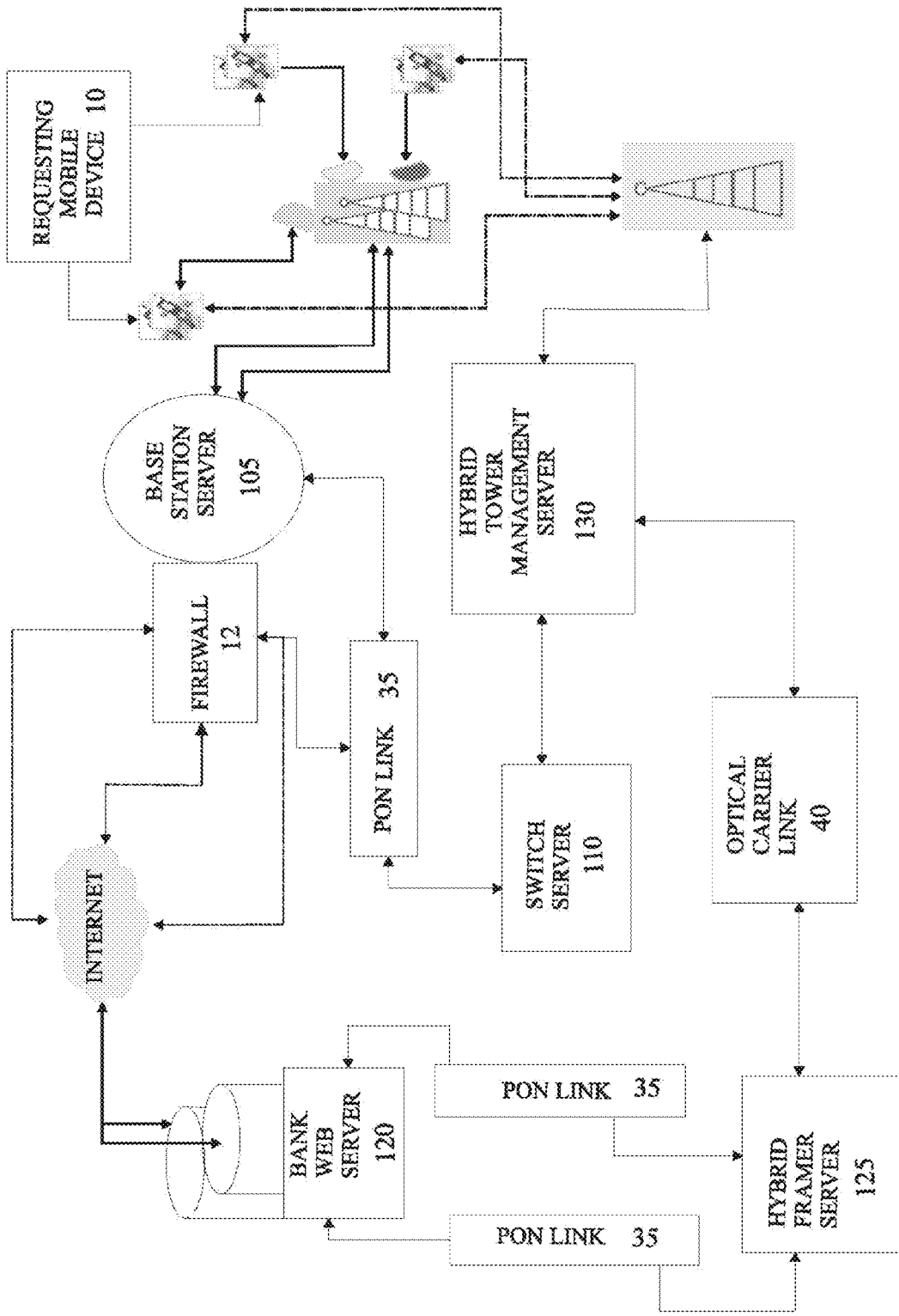
FIG. 5 is a flow chart illustrating another exemplary embodiment of the present disclosure, according to which the hybrid telecommunication system is utilized for facilitating banking transactions.

FIG. 5 is a flow chart illustrating another exemplary embodiment of the present disclosure, according to which the hybrid telecommunication system is utilized for facilitating banking transactions. In FIG. 5, the data path denoted by dotted lines describes the conventional mode of carrying out banking transactions wherein users directly contact the bank server through a mobile device. As shown in FIG. 5, users make use of mobile devices denoted by reference numeral 10 (referred to as 'requesting mobile devices') to access the bank web server 120. As shown in FIG. 5, users through their mobile devices request to log on to the bank web server 120. In case of a typical banking transaction, the data request signals sent by a user also include the authentication credentials corresponding to the user. Such authentication credentials, in the form of data request signals are transmitted over the conventional wireless network to the web server 120.

The bank web server 120 verifies the authentication credentials provided by the user through the data request signal and subsequently, depending upon the genuineness of the provided authentication credentials, selectively authorizes the user to access the bank web server 120. The subsequent communication between the requesting mobile device 10 associated with the user, and the bank web server 120 takes place as explained below.

The data request signals corresponding to the subsequent communication from the requesting mobile device 10 are received at the base station server 105. The base station server 105 is communicably coupled to a switch server 110 through a Passive Optical Network (PON) link denoted by reference numeral 35. The base station 105 also includes a firewall 12 adapted to prevent unauthorized access. The passive optical link 35 is a physical link created using optical fiber cables. The switch server 110 is adapted to sense the current load/current density of data packets on the wireless network maintained by cellular operator. Depending upon the current load/current density of the data packets on the wireless network, the switch server 110 redirects at least a few of the incoming data request signals onto the hybrid tower management server 130. The hybrid tower management server 130 communicates with hybrid framer server 125 through an optical carrier link denoted by reference numeral 40. The tower management server 130 transmits the received data request signals to the hybrid framer server 125. It is well known that the data request signals generated from a mobile device are in a packet data format. Therefore the hybrid framer server 125 converts the incoming data request signals which are in the form complaint with the packet data protocol to a format compatible with the bank web server 120. The telecommunication system 100, in accordance with the present disclosure makes use of a dedicated optical carrier instead of the conventional wireless network to carry the data request signal emanating from the requesting mobile device 10, thereby providing a virtual, point to point connectivity between the requesting mobile device 10 and the bank web server 120.

The return communication form the bank web server 120 to the requesting mobile device 10 is transmitted from the bank web server 120 through the PON link, firstly to the hybrid framer server 125 which coverts it into the appropriate packet format and forwards it via the optical carrier (PON Link) to the hybrid tower management server 130. The hybrid tower management server 130, subsequent to receiving the acknowledgement form the bank web server 120 about the genuineness of the user associated with the requesting mobile device, allocates private, wireless bandwidth denoted by reference numeral 45 for any further communication between the requesting mobile device 10 and the hybrid tower management server 130.

In accordance with the present disclosure, all the further data request signals apart from the initial request signals that contain the authentication credentials, emanating from the user's requesting mobile device 10 will be routed through the private, wireless communication bandwidth to the hybrid tower management server 130. Subsequently, the hybrid tower management server 130 routes the request signals through the optical carrier to the hybrid packet framer 125, from where the request signals are transmitted to the bank web server 120. The hybrid telecommunication system of the present disclosure provides virtual, point to point connectivity between the requesting mobile device 10 and the respective bank web server 120 by offering the requesting mobile device 10 with private wireless bandwidth to initiate and complete the new communication. The initial data request signals are received by the hybrid tower management server 130 which subsequently makes use of the optical carrier (PON Link) to carry forward and process the request initiated through the requesting mobile device 10.

Figure 6:
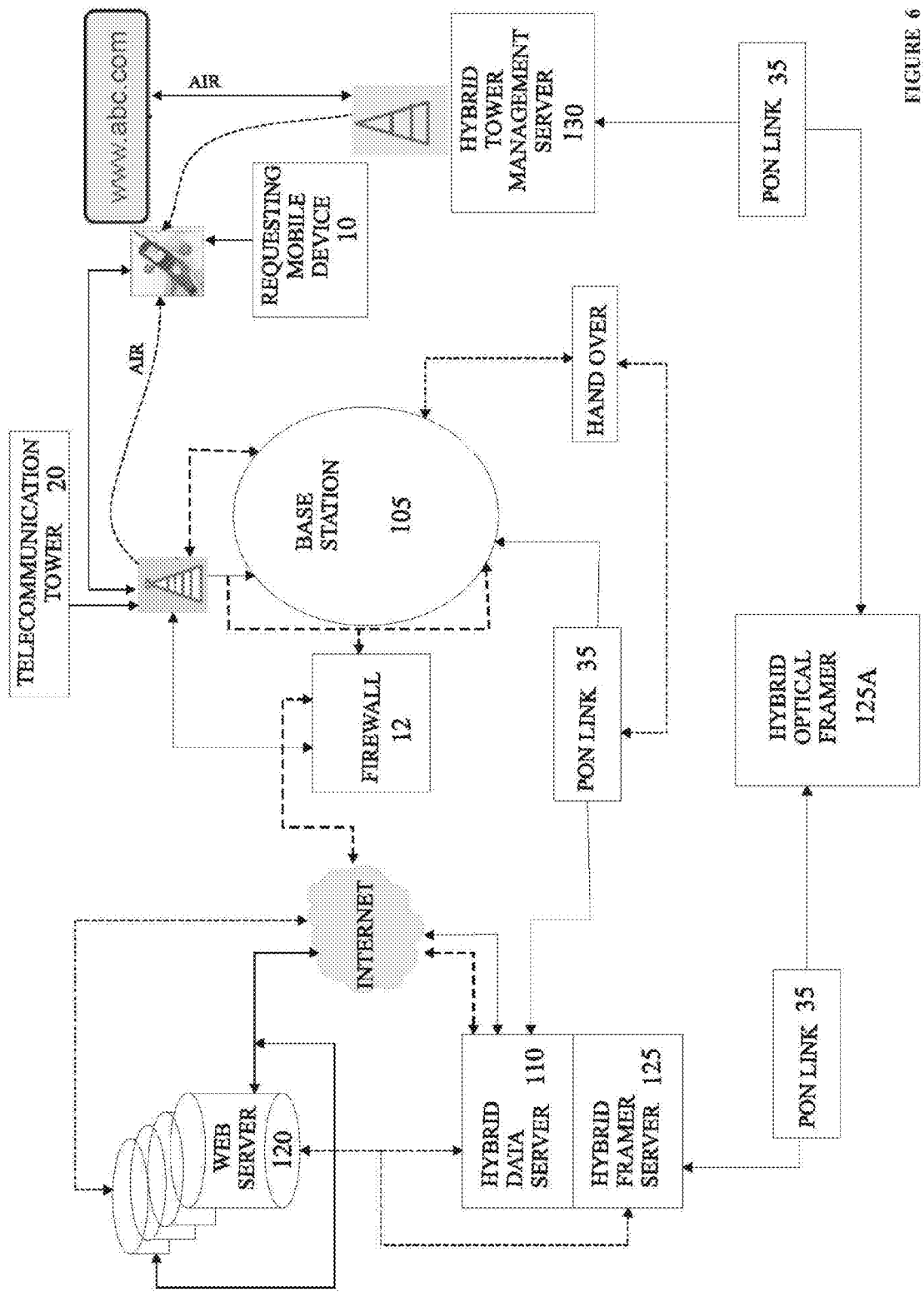
FIG. 6 is a flow chart illustrating another exemplary embodiment of the present disclosure.

FIG. 6 is a flow chart illustrating another exemplary embodiment of the present disclosure wherein a user having a requesting mobile device 10 accesses the web server 120 using the telecommunication system 100 envisaged by the present disclosure. As shown in FIG. 6, a request for accessing a web server 120 is generated from the requesting mobile device 10 and transmitted to the telecommunication tower 20 via the conventional wireless network. From the telecommunication tower 20, the request signals are routed to the base station 105 which includes switching means adapted to handover the incoming data request signals to the hybrid data server 110. The hybrid data server 110 is connected to the switching means through a dedicated optical carrier (typically, a passive optical network connection). Subsequent to receiving the request signals, the hybrid data server 110 processes the request signals and extracts the requested data from the internet through at least one web server 120. The hybrid data server also cooperates with a hybrid farmer server 125 which is adapted to convert the data retrieved from the web server 120 to packet data protocol format, for example IP or x.25 so that it could be transmitted over the conventional wireless network. The hybrid data server 110 and the hybrid framer server 125 communicate with one another through the dedicated optical fiber link. The hybrid framer server 125 further transmits the data packets corresponding to the received request signals to the hybrid tower management server 130 through a hybrid optical framer 125A. The hybrid tower management server 130 allocates private, wireless bandwidth for communication with the requesting mobile device 10 and subsequently transmits the data packets corresponding to the received request signals, to the requesting mobile device 10 using the private, wireless bandwidth.

Figure 7:
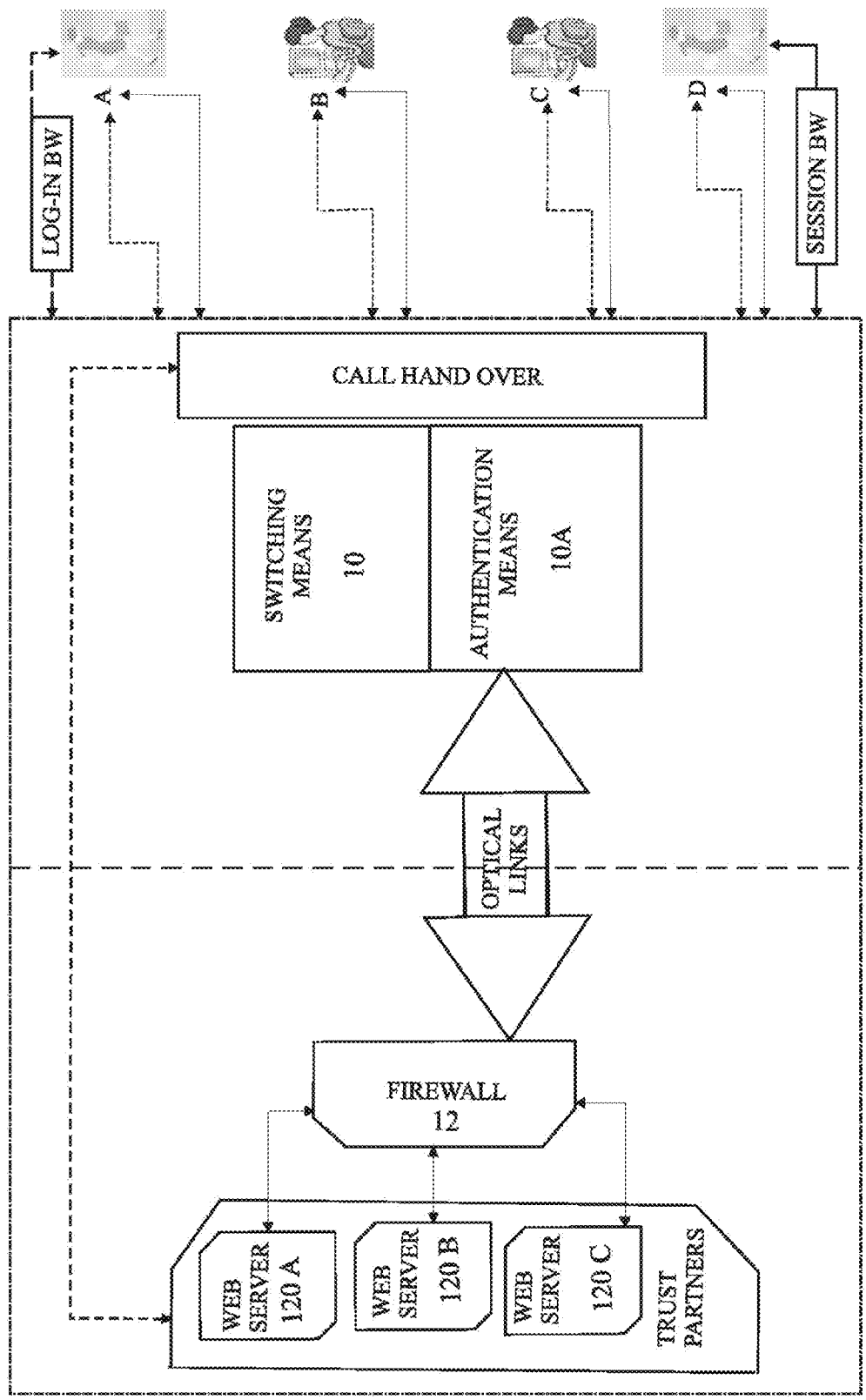
FIG. 7 is a flow chart illustrating another exemplary embodiment of the present disclosure.

FIG. 7 is a flow chart illustrating another exemplary embodiment of the present disclosure. The system 100, in accordance with the present disclosure allows multiple users to access the web servers using multiple communication gadgets such as mobile phones, laptop computers and desktop computers. Web servers in case of this particular figure are the servers associated with banking organizations, denoted by reference numerals 120A, 120B and 120C. Users in this figure are denoted by reference alphabets A, B, C and D. The requests from multiple users are routed to the system 100 via conventional wireless networks which provides the user with the network bandwidth necessary for logging onto the system 100. Subsequent to the routing of the request signals to the system 100 the user is switched over form the conventional communication network to a hybrid telecommunication network. The switching means 10 is able to handover the client communication from the conventional wireless network. The switching means 10 also cooperates with an authentication means 10A which is adapted to perform multi factor authentication of the user prior to transferring the request signals initiated by the user, to the hybrid telecommunication network. Such a transfer from the conventional wireless network such as GPRS/2G/3G/WiMax/EDGE network takes place via the switching means 10. The system 100 also includes a firewall located between the system 100 and application servers in order to block any unauthorized access to the web servers 120A, 120B and 120C.

Figure 8:
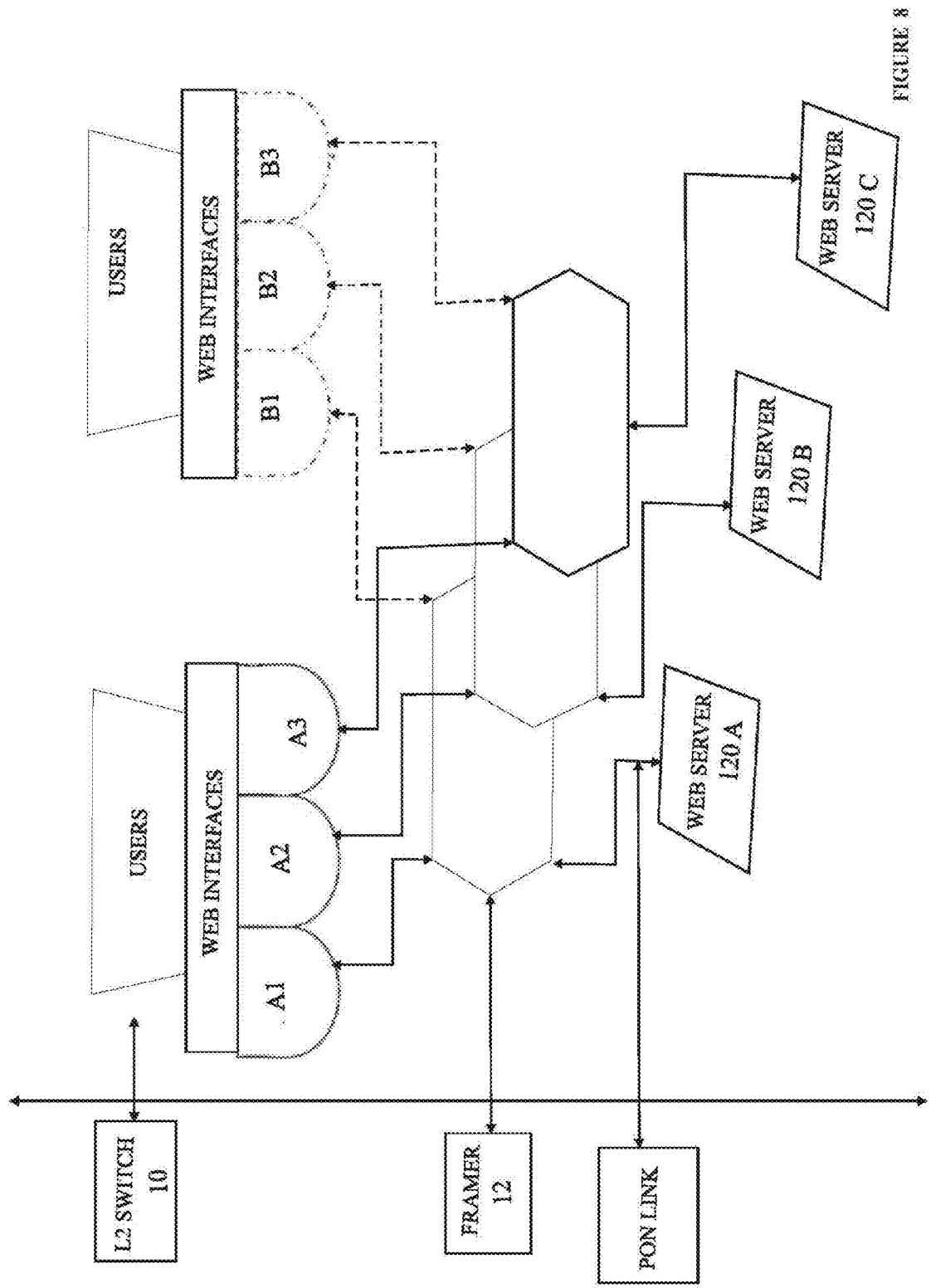
FIG. 8 is a flow chart illustrating the topology of the telecommunication system in accordance with the present disclosure.

FIG. 8 is a flow chart illustrating the topology of the telecommunication system in accordance with the present disclosure. As shown in FIG. 8, users log on to the required web interface (denoted by A1, A2, A3 AND B1, B2, B3) through an L2 switch denoted by the reference numeral 10. The request signals generated by the users are routed through the framer denoted by reference numeral 12. The web servers denoted by reference numeral 120A, 120B, 120C and 120D are connected via dedicated passive optical links (PON) to the framer 12. The framer 12 is responsible for enabling the request signals generated by the users to reach the web servers 120A, 120B, 120C and 120D.

In accordance with the present disclosure, the system 100 offers private, wireless bandwidth to pre registered users for performing critical transactions including but not restricted to banking and financial transactions. The private, wireless bandwidth offered to a requesting mobile device is session based and specific to that particular requesting mobile device. The private, wireless bandwidth is offered to the requesting mobile device irrespective of the presence of the original service provider's network thereby implying that the users need not depend upon the public, shared wireless bandwidth provided by the service provider in order to initiate/complete their critical transactions.

Figure 9:
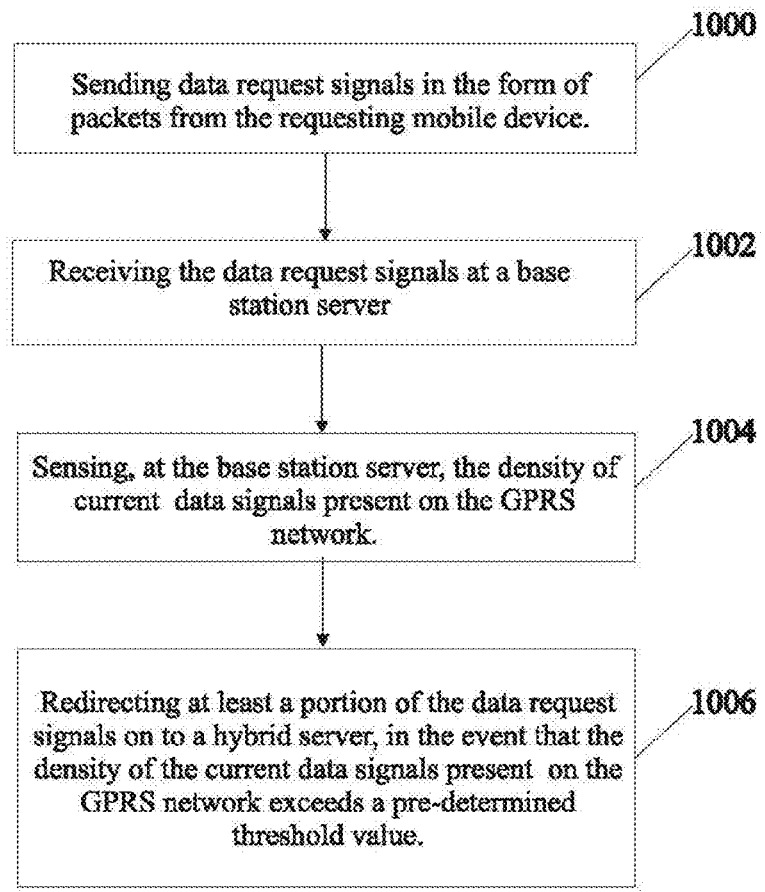
FIG. 9 is a flow chart illustrating the method for providing data to a requesting mobile device using a hybrid telecommunication system.

Referring to FIG. 9, there is shown a flowchart corresponding to the method for providing data to a requesting mobile device using a hybrid telecommunication system. The method, in accordance with the present disclosure includes the following steps:

sending data request signals in the form of packets from the requesting mobile device (1000);

receiving the data request signals at a base station server (1002);

sensing, at the base station server, the density of current data signals present on the conventional wireless network (1004); and redirecting at least a portion of the data request signals from the conventional wireless network on to a hybrid server, in the event that the density of the current data signals present on the conventional wireless network exceeds a pre-determined threshold value (1006).

Figure 10:
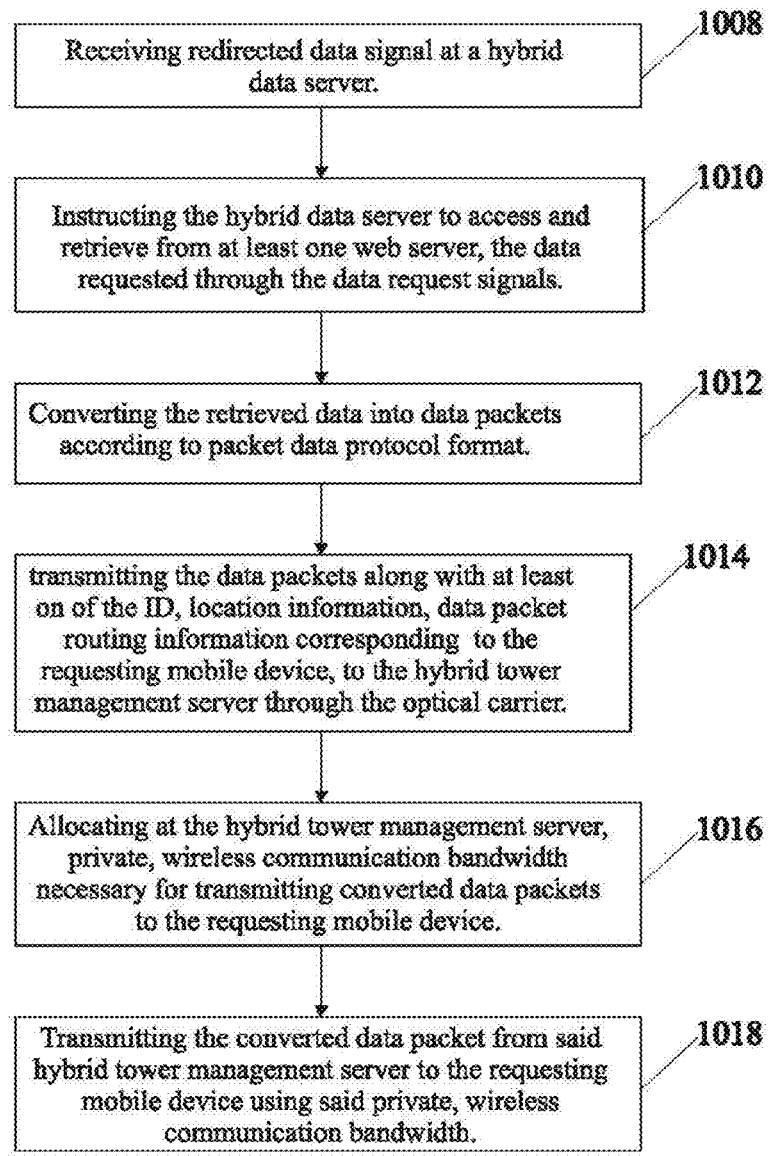
FIG. 10 is a flow chart illustrating the method for providing data to a requesting mobile device using a hybrid telecommunication system.

Referring to FIG. 10, there is shown a flow chart corresponding to the method for providing data to a requesting mobile device using a hybrid telecommunication system. The method, in accordance with the present disclosure includes the following steps:

receiving redirected data request signals at a hybrid data server (1008);

instructing the hybrid data server to access and retrieve from at least one web server, the data requested through the data request signals (1010);

converting the retrieved data into data packets according to packet data protocol format (1012);

transmitting the data packets along with at least one of the ID, location information, data packet routing information corresponding to the requesting mobile device, to a hybrid tower management server through the optical carrier (1014);

allocating at the hybrid tower management server, private, wireless communication bandwidth necessary for transmitting converted data packets to the requesting mobile device (1016); and transmitting the converted data packets from said hybrid tower management server to the requesting mobile device using said private, wireless communication bandwidth (1018).

Typically, in accordance with the present disclosure, the step of redirecting at least a few data request signals (1006), further includes the step of redirecting at least a few data signals from the conventional wireless network onto the hybrid data server through the optical carrier.

Typically, in accordance with the present disclosure, the step of receiving at a hybrid data server, the redirected data request signals (1008) further includes the step of receiving at least one of the ID, location information, data packet routing information and user profile information corresponding to the requesting mobile device.

Typically, in accordance with the present disclosure, the step of instructing the hybrid data server to access and retrieve from at least one web server, the data requested through said data request signals (1010), further includes the step of transmitting the retrieved data along with the ID, location information, data packet routing information, user profile information corresponding to the requesting mobile device, to the hybrid framer server.

Typically, in accordance with the present disclosure, the step of converting the retrieved data into data packets according to packet data protocol format (1012) further includes the step of transmitting converted data packets along with at least one of the ID, location information, data packet routing information corresponding to the requesting mobile device to the hybrid tower management server through a optical carrier.

Typically, in accordance with the present disclosure, the step of transmitting to the requesting mobile device, through the optical carrier, the data packets received at the hybrid tower management server (1016) further includes the step of identifying the requesting mobile device based on at least one of the ID, location information, data packet routing information, user profile information corresponding to the requesting mobile device.

Technical Advancements

The technical advancements offered by the present disclosure include the realization of:

a system which can prevent congestion due to multiple, large data calls in wireless telecommunication network;

a robust system to prevent congestion which is compatible with present wireless infrastructure;

a system which is easy to deploy and is cost effective and scalable;

a space effective and time effective system;

a system providing private point to point communication bandwidth for the mobile devices;

a parallel platform for handling data call traffic within the interne; and a system providing users high speed interne connectivity during travel.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

While considerable emphasis has been placed herein on the particular features of this disclosure, it will be appreciated that various modifications can be made, and that many changes can be made in the preferred embodiment without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:

1. A hybrid telecommunication system comprising:
a requesting mobile device adapted to transmit data request signals, the requesting mobile device further adapted to receive data packets containing data requested through the data request signals;
a support node adapted to store at least one of an ID, location information, data packet routing information and user profile information corresponding to the requesting mobile device;
a base station server adapted to receive the data request signals, said base station server comprising:
load sensing means adapted to sense density of current data signals on a conventional wireless network; and
switching means co-operating with said load sensing means and adapted to redirect at least some of the received data request signals from the conventional wireless network to a hybrid data server connected to a wireline network, if the density of current data signals present on the conventional wireless network exceeds a pre-determined threshold value;
the hybrid data server adapted to:
receive redirected data request signals;
receive at least one of the ID, location information, data packet routing information and user profile information corresponding to the requesting mobile device, from the support node;
retrieve from at least one web server, the data requested through said data request signals; and
transmit the retrieved data along with the ID, location information, data packet routing information, user profile information corresponding to the requesting mobile device;
a hybrid framer server adapted to:
receive data from said hybrid data server;
convert the data received from the hybrid data server to data packets according to packet data protocol format; and
transmit converted data packets along with at least one of the ID, location information, data packet routing information corresponding to the requesting mobile device through an optical carrier; and
a hybrid tower management server adapted to:
receive data from said hybrid framer server;
convert the data received from the hybrid framer server to data packets according to packet data protocol format;
identify the requesting mobile device based on at least one of the ID, location information, data packet routing information, user profile information received from the hybrid framer server;
allocate private, wireless communication bandwidth for transmitting converted data packets to the requesting mobile device;
transmit said converted data packets to the requesting mobile device using said private, wireless communication bandwidth.

2. The system as claimed in claim 1, wherein said base station server further includes notification means adapted to notify a user of requesting mobile device about diversion of data request signals to the hybrid data server.

3. The system as claimed in claim 1, wherein said hybrid data server is adapted to store at least one of the ID, location information, data packet routing information and user profile information corresponding to the requesting mobile device.

4. The system as claimed in claim 1, wherein said data request signals include data call requests for downloading content from the Internet using the conventional wireless network.

5. The system as claimed in claim 1, wherein said hybrid data server is adapted to extract information from received data request signals and convert them into signals compatible with the web server.

6. The system as claimed in claim 1, wherein the optical carrier is a communication network, at least partially formed by optical fibers.

7. A method of providing data to a requesting mobile device using a hybrid telecommunication system, said method comprising the following steps:
sending data request signals in form of packets from the requesting mobile device;
receiving the data request signals at a base station server;
sensing, at the base station server, density of current data signals present on a conventional wireless network;
redirecting at least a portion of the data request signals on to a hybrid data server, if the density of the current data signals present on the conventional wireless network exceeds a pre-determined threshold value, receiving redirected data request signals at the hybrid data server;

instructing the hybrid data server to access and retrieve from at least one web server, data requested through the redirected data request signals;

converting the retrieved data into data packets according to packet data protocol format;

transmitting the data packets along with at least one of an ID, location information, data packet routing information corresponding to the requesting mobile device, to a hybrid tower management server through an optical carrier;

instructing the hybrid tower management server to allocate, private, wireless communication bandwidth necessary for transmitting converted data packets to the requesting mobile device; and transmitting said converted data packets from said hybrid tower management server to the requesting mobile device using said private, wireless communication bandwidth.

8. The method as claimed in claim 7, wherein the step of redirecting at least a portion of the data request signals, further includes the step of redirecting at least a portion of the data request signals onto the hybrid data server through the optical carrier.

9. The method as claimed in claim 7, wherein the step of receiving at the hybrid data server, the redirected data request signals further includes the step of receiving at least one of the ID, location information, data packet routing information and user profile information corresponding to the requesting mobile device.

10. The method as claimed in claim 7, wherein the step of instructing the hybrid data server to access and retrieve from at least one web server, the data requested through said redirected data request signals, further includes the step of transmitting the retrieved data along with the ID, location information, data packet routing information, user profile information corresponding to the requesting mobile device, to a hybrid framer server.

11. The method as claimed in claim 7, wherein the step of converting the retrieved data into data packets according to packet data protocol format further includes the step of transmitting converted data packets along with at least one of the ID, location information, data packet routing information corresponding to the requesting mobile device, to the hybrid tower management server through an optical carrier.

12. The method as claimed in claim 7, wherein the step of instructing the hybrid tower management server to allocate, private, wireless communication bandwidth necessary for transmitting converted data packets to the requesting mobile device further includes the step of identifying the requesting mobile device based on at least one of the ID, location information, data packet routing information, user profile information corresponding to the requesting mobile device.

\* \* \* \* \*